US012203307B2

(12) United States Patent
Liermann

(10) Patent No.: US 12,203,307 B2
(45) Date of Patent: Jan. 21, 2025

(54) DOOR HINGE

(71) Applicant: Nicolas Liermann, Rheda-Wiedenbrueck (DE)

(72) Inventor: Nicolas Liermann, Rheda-Wiedenbrueck (DE)

(73) Assignee: SIMONSWERK GMBH, Rheda-Wiedenbrueck (DE)

( * ) Notice: Subject to any disclaimer, the term of this patent is extended or adjusted under 35 U.S.C. 154(b) by 0 days.

(21) Appl. No.: 17/963,232

(22) Filed: Oct. 11, 2022

(65) Prior Publication Data

US 2023/0151655 A1 May 18, 2023

(30) Foreign Application Priority Data

Nov. 16, 2021 (DE) ......................... 102021129914.4

(51) Int. Cl.
*E05D 11/06* (2006.01)
*E05D 3/06* (2006.01)

(52) U.S. Cl.
CPC ..................................... *E05D 3/06* (2013.01)

(58) Field of Classification Search
CPC .... E05D 3/06; E05D 3/12; E05D 3/14; E05D 3/142; E05D 3/16; E05D 3/125; E05D 3/127; E05D 3/185; E05D 3/186; E05D 7/04; E05D 7/0423; E05D 7/0415; E05D 7/043; E05D 7/0027; E05D 7/0045; E05D 5/02; E05D 5/0215; E05D 5/062; E05D 2007/0438; E05D 2007/0446; E05D 2007/0453; E05D 2007/0461; E05D 2007/0469; E05D 2007/0476; E05D 2007/0484; E05D 2007/0492; E05D 9/00; E05Y 2600/41; E05Y 2600/634; E05Y 2600/412; E05Y 2600/45; E05Y 2600/452; E05Y 2600/46; E05Y 2600/51; E05Y 2900/132; E05Y 2900/20; E05Y 2900/50; E05Y 2900/531; E05Y 2900/546; E05Y 2201/624; E05Y 2201/638; E05Y 2800/45; E05Y 2800/674
See application file for complete search history.

(56) References Cited

U.S. PATENT DOCUMENTS 2,200,142 A * 5/1940 Witschi ..................... E05D 3/16 16/369
3,871,083 A * 3/1975 Smith ....................... E05D 5/02 160/118

(Continued)

FOREIGN PATENT DOCUMENTS

DE 2502774 A * 7/1976 ......... E05D 11/1021
DE 202010016896 U 3/2011

*Primary Examiner* — Chuck Y Mah
(74) *Attorney, Agent, or Firm* — Andrew Wilford

(57) ABSTRACT

A door hinge has a first leaf assembly, a second leaf assembly and a link assembly for pivoting of the first leaf assembly on the second leaf assembly between an open position and a closed position. This link assembly in turn has a first hinge link and a second hinge link pivoted about a connecting axis on the first link. The first hinge link is formed with a contact face that in the open position flatly engages a contact face of the second hinge link. This the first contact face also is formed with a projection that in the open position engages complementarily in a recess formed in the second hinge link.

11 Claims, 4 Drawing Sheets

(56) References Cited

U.S. PATENT DOCUMENTS

| | | | | | |
|---|---|---|---|---|---|
| 5,035,026 | A * | 7/1991 | Carlo | E05D 3/16 | 16/302 |
| 5,632,064 | A * | 5/1997 | Lautenschlager | E05D 5/08 | 16/382 |
| 11,091,940 | B2 * | 8/2021 | McGregor | E05F 5/06 | |
| 2003/0088943 | A1 * | 5/2003 | Neukotter | E05D 7/0423 | 16/366 |
| 2011/0041290 | A1 * | 2/2011 | Herglotz | E05D 3/18 | 16/375 |
| 2014/0215761 | A1 * | 8/2014 | Zetti | E05D 3/16 | 16/288 |
| 2018/0216379 | A1 * | 8/2018 | Spoelstra | E05D 3/14 | |
| 2020/0300013 | A1 * | 9/2020 | Chadwell | E05D 11/1057 | |
| 2022/0056742 | A1 * | 2/2022 | Kim | E05D 11/10 | |
| 2022/0235592 | A1 * | 7/2022 | Gutierrez-Fernandez | E05D 11/1014 | |

* cited by examiner

DOOR HINGE

FIELD OF THE INVENTION

The present invention relates to a door hinge. More particularly this invention concerns such a hinge having a first leaf assembly, a second leaf assembly and a link assembly pivotally connecting the first hinge assembly to the second hinge assembly for pivoting between an open position and a closed position.

BACKGROUND OF THE INVENTION

In such a door hinge the link assembly comprises a first hinge link and a second hinge link pivotal therein about an axis. The first hinge link has a contact face that in the open position flatly engages a contact face of the second hinge link.

Such door hinges are commonly also referred to as "multiaxis hinges." They can be, depending after connection of the hinge link with the first leaf assembly and the second leaf assembly in particular as five-axis hinges, six-axis hinges or seven-axis hinges. This makes it possible to install the door flush, yet still able to open by swinging through an angle of up to 180°. Such concealed door hinges are used in particular in especially high-quality environments.

The indirect force guidance by the hinge link assembly leads however also to a certain flexibility in particular in the open position. Despite high-quality manufacture and the use of stable materials, a clearly defined stop is not achievable in all cases. Tight product tolerances, resilient materials (in particular in bearings) and large lever ratios lead to that concealed door hinges often having in the open position a "springy" feel. Although the objective stability is not affected by this, a clear defined stop in the open position is desirable.

A generic door hinge is known from DE 20 2010 016 896.

Against this background the object of the invention is to stabilize the hinge link assembly of a multiaxis hinge in such a way that there is a clearly defined stop in the open position.

OBJECTS OF THE INVENTION

It is therefore an object of the present invention to provide an improved door hinge.

Another object is the provision of such an improved door hinge that overcomes the above-given disadvantages, in particular that is particularly stable, in particular in the open position.

SUMMARY OF THE INVENTION

According to the invention the first contact face has a projection that in the open position engages complementarily in a recess of the second hinge link. The complementary shape and fit between the projection and the recess significantly improves the stability of the hinge link assembly in the open position. This reduces especially elasticity at the connection between the first hinge link and in the second hinge link, i.e. in the area of the connection. As a result, in the open position the first hinge link and the second hinge link act more like a rigid unit, so that also the subjective stability of the door hinge in the open position is increased.

In particular, the first contact face is aligned approximately radially with respect to the connecting axis between the first hinge link and the second hinge link. The first hinge link and the second hinge link are preferably connected to each other by a connecting pin so as to be pivotal about the connecting axis. The first contact face in particular lies in a plane that runs through the connecting bolt, especially preferably on the connecting axis The approximately radial alignment leads to the first hinge in the area of the first contact striking the second hinge link of the second contact face flatly during pivoting.

Appropriately, the projection extends at an angle between 90° and 135°, preferably about 120°, from the first contact face.

The projection extending from the first contact face at approximately a right angle or with a slightly obtuse angle is approximately tangentially aligned with respect to the connection axis. Accordingly the contact faces come on pivoting of both hinge links with a nearly parallel shear movement to the contact planes in contact. Thus, in combination with the contact of the first and second contact face, a defined stop of the first hinge link and of the second hinge link is provided that also causes a slight radial tension by the approximately tangentially extending contact face at the projection. Thus the bearing clearance, in particular at the connecting axis, is reduced and the stability of the subassembly of the first and second hinge links is increased.

Preferably the door hinge according to the invention is designed as multiple hinge, in particular in a five-, six- or seven axis construction. This way the first hinge link is pivotal about a first hinge axis on the first leaf assembly. Furthermore the first hinge link is positively guide rotationally on the second leaf assembly. The second hinge link is rotatably guided around a fourth axis at the second leaf assembly and the first leaf assembly is forcibly guided about a third hinge axis.

Pivoting of the door hinge between the open position and the closed position displaces the hinge link assembly with respect to the two leaf assemblies so that the second hinge axis and the third hinge axis are moved along the respective constraining guides. These displacements are caused by a relative pivoting of the first hinge link with respect to the second hinge link and the associated spacing change between the first hinge axis and the fourth hinge axis or the second hinge axis and the third hinge axis. The first hinge axis, the second hinge axis, the third hinge axis, the fourth hinge axis and the connecting axis are parallel to each other and in particular vertical.

In the framework of the invention it is in particular possible, that the second hinge axis is positively guided on the second leaf assembly and/or the third hinge axis is positively guided on the first leaf assembly in a link guide. These can be in particular straight-line, although the invention does not have to be limited to such embodiments. Likewise the second hinge axis on the second leaf assembly and/or the third hinge axis on the first leaf assembly can be positively guided by a pivot lever. The respective pivot lever is thereby pivoted around an axis parallel to the hinge axes and the connecting axis and is held on the leaf assembly corresponding to and thereby causes a circular positive guidance of the hinge axis associated with.

According to a particularly preferred embodiment the second hinge axis is positively guided on the second leaf assembly with a pivot link. The combination of a first link guided on a pivot link ensures that the stabilization according to the invention can be used in special manner to effect. Even in embodiments with six or seven axes (connecting axis, hinge axes and pivot axes) in the past there is often a particularly soft and "resilient" stop. In particular, such embodiments benefit from the additional stabilization in the context of the present invention.

It is convenient that the pivot link in the open position is with its inner face in flat contact with an outer face of the second hinge link. This flat contact creates an additional support and limits pivoting of the pivot link definitely.

Particularly preferably the outer face of the second hinge link forms with the second contact face an angle between 90° and 135°, preferably about 120°. This way the second hinge link in the to stabilizing open position enclosed on three sides, namely by the flat pivot link, the angularly adjacent first contact face of the first hinge link, and finally the angularly adjacent projection of the first hinge link. In the open position the second hinge link is thereby surrounded on three sides, so that a secure locking results. In addition the contact between the projection and the recess can cause a tensioning and/or displacement of the first hinge link toward the connecting axis. In one such embodiment the pivot link is pressed against the stop of the inner and outer faces, so that this bracing force results in a particularly secure and stable connection of first hinge link, second hinge link and pivot link. As a result the three components form a single rigid assembly that promotes the stabilization of the entire door hinge in the open position considerably.

According to a particularly preferred embodiment, the inner face of the pivot link extends in a plane running through the pivot pin carrying pivot link with the second leaf assembly in particular through the pivot axis. Thereby the inner face, just like as the outer face is particularly evenly formed. This radial alignment ensures that the stop is effected between the inner face and the outer face parallel to the pivot movement. With an additional load caused interaction between the projection and the recess, there is no pull or tension with respect to the connection axis and no horizontal movement, i.e. radial to the pivot axis. By this construction an exact maximum opening angle of the open position can be fixed.

By stabilizing the open position according to the invention, the maximum opening angle can be precisely determined. This is preferably between 135° and 180°, in particular between 170° and 180°. According to a particularly preferred embodiment of the invention, the maximum opening angle of the door hinge with a accuracy of less than 3° lies in a range between 175° and 180° fixed. Thereby in particular the size of the door panel as well as superstructures mounted thereon such as for example door handles can be taken into account in such a way, that collision with the wall face surrounding the door is safely avoided.

Preferably the first leaf assembly has a casing holding the hinge link assembly and the second leaf assembly has a second casing also holding the hinge link assembly.

According to a preferred embodiment of the invention the pivot link in the closed state lies with a back face against the second casing. This way in the closed position the hinge link assembly is stabilized.

According to a particularly preferred embodiment the first hinge link is T-shaped and the second hinge link is 0-shaped. The first hinge link has a central leg member section and a crosspiece at one end. The second hinge link is formed from two vertical members connected to each other horizontally by upper and lower connecting members. The first hinge link thereby engages with the middle member through the opening of the second hinge link. A connecting pin formed concentrically about the connecting axis engages the second hinge link at the connecting members and the first hinge link at the middle member. The vertical members of the first hinge member of the second hinge member have preferably the same height.

According to a particularly preferred embodiment the pivot link is C-shaped with a vertical member and two horizontal holding members at the ends of the vertical member. The holding members embrace thereby an end of the middle leg member of the first hinge link and are with this—with a around the second hinge axis concentrically arranged second hinge pin—rotatable connected.

According to a preferred embodiment the retaining members form at least partially an inner face for abutment on the second hinge link. Usefully the ends of the holding sections in contrast have a projecting thickening that particularly preferably engages in the open position in a recess associated with the outer face of the second hinge link. Hence the hinge link assembly fits snugly with the first hinge link, second hinge link and pivot link that in turn fit snugly together at several in different directions with contact faces.

To reduce friction, the hinge axles, the connecting axles as well as possible pivot axles are supported preferably by bearings or slide blocks supported on the hinge link assembly and/or the leaf assemblies. These are preferably made of a plastic material and in particular provided with a friction reducing coating, for example of PTFE.

In principle it is sufficient for the realization of the invention, if the first hinge link only has the projection that engages in complementary recess of the second hinge link. It is in the scope of the invention however also possible that in addition also the second hinge link has a projection that in the area of the first leaf assembly it engages in a respective recess of the first hinge link. Thus the stabilizing effect can be achieved both in the contact area with the first leaf assembly and with the second leaf assembly.

The present invention is particularly suitable for asymmetrically constructed door hinges. Thereby can the stabilization according to the invention especially preferably be used at a (second) leaf assembly, which provides a forced guidance with the help of a pivot link. The second leaf assembly can thereby be optimized even with a particularly small installation depth. The leaf assembly can ensure forced guidance of a (fourth) hinge axis in particular over a linear guide realized. To this end the first leaf assembly has a greater installation depth than the second leaf assembly. Particularly preferably the first leaf assembly can have a installation depth corresponding at least to twice the installation depth of the second leaf assembly. Thereby an additional stabilization in the area of the first leaf assembly is not necessary.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
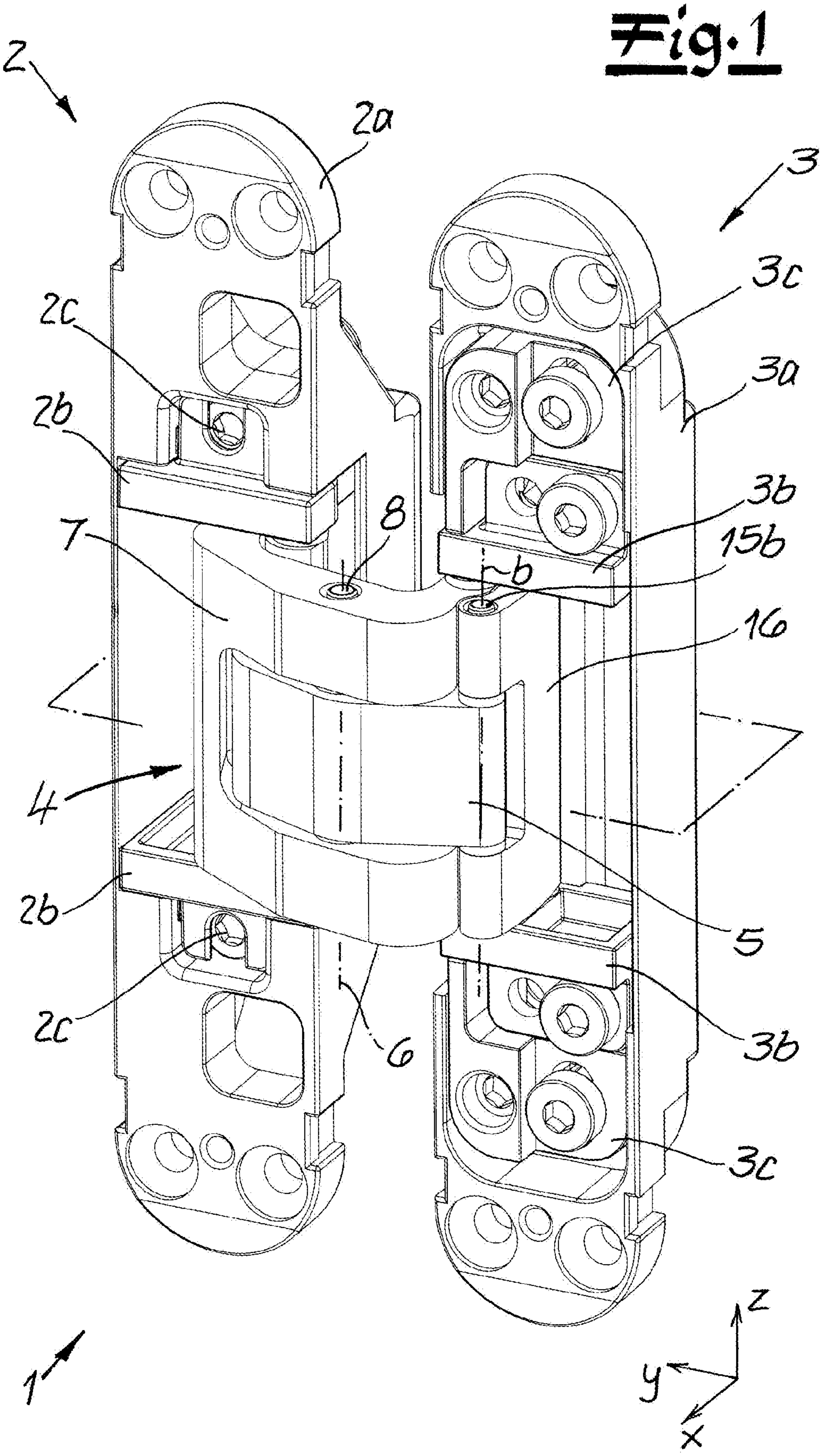
FIG. 1 is a three-dimensional view of a door hinge according to the invention.
Figure 2A:
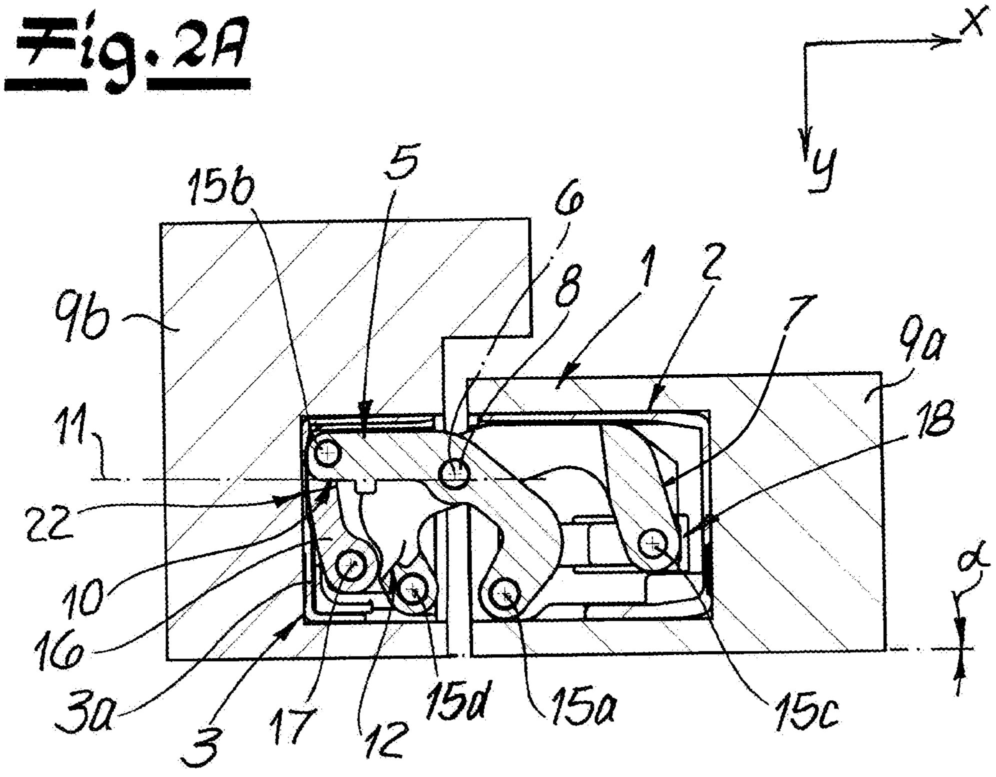
FIGS. 2A to 2C are horizontal sections through the door hinge according to the invention in various open positions.
Figure 2C:
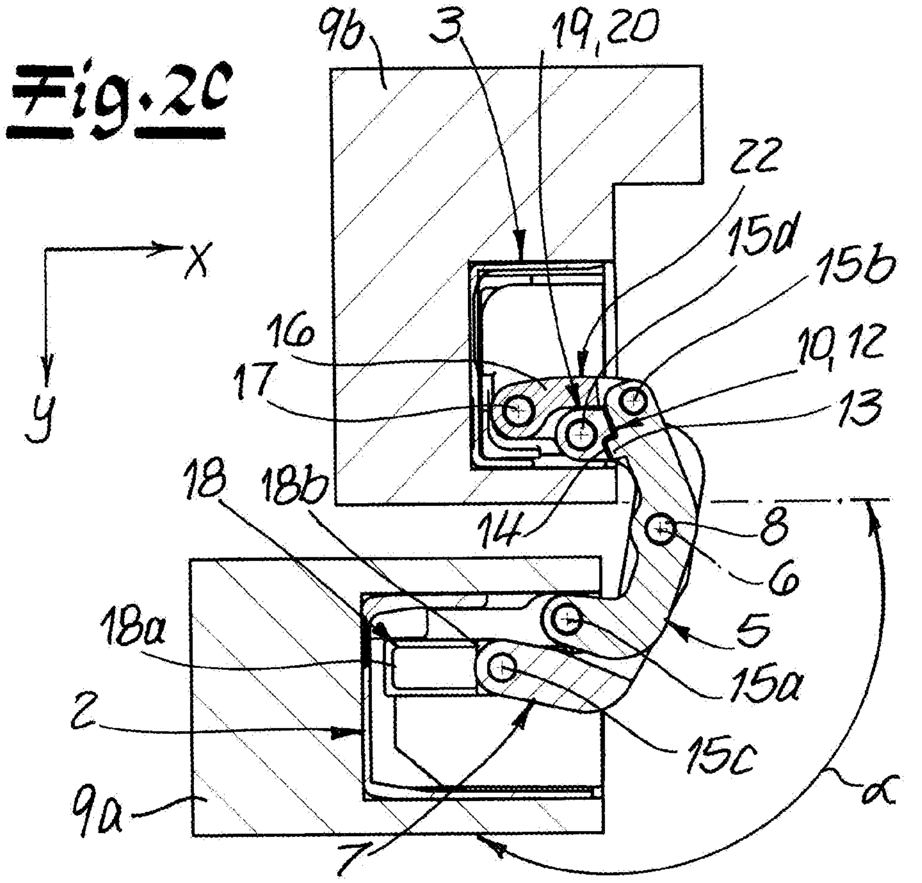

FIG. 1 shows in a three-dimensional view a door hinge according to the invention 1 having a first leaf assembly 2, a second leaf assembly 3, and a hinge link assembly 4 therebetween for relative pivoting of the first leaf assembly 2 and the second leaf assembly 3 between an open position shown in FIGS. 1 and 2C and a closed position shown in FIG. 2A. The door hinge 1 extends in a vertical direction z, a horizontal direction x, and a pressing direction y. The pivoting movement caused by the hinge link assembly 4 thus includes rotation about the vertical direction z. The amount of rotation relation to the closed position is also called the opening angle α. The opening movement enabled by the hinge link assembly is thereby not purely of a rotational nature, but further comprises also a translational or straight-line component.

The hinge link assembly 4 includes a first hinge link 5 and a second hinge link 7 pivotally connected to the first hinge link 5 about a connection axis 6. The connection between the first hinge link 5 and the second hinge link 7 is provided by a connecting pin 8 arranged on the connecting axis 6.

Figure 2B:
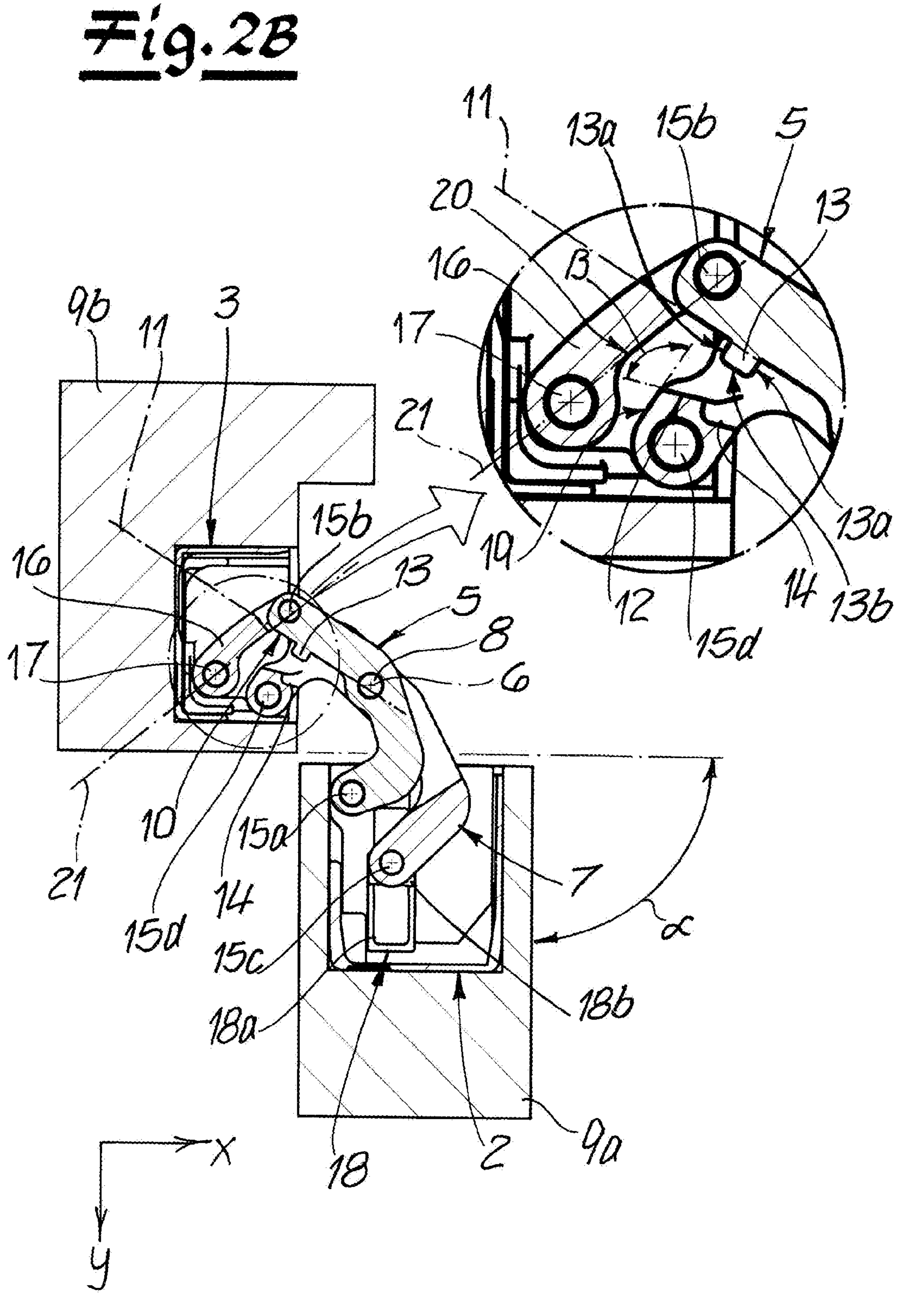

In FIGS. 2A to 2C the door hinge 1 according to the invention is shown in different open positions in the installed state. Here, the first leaf assembly 2 is set in an edge mortise a door panel 9*a* and the second leaf assembly 3 is set in am edge mortise of a door frame 9*b*. In FIG. 2A shown closed position (with a opening angle α of 0°) the door hinge 1 concealed between the door panel 9*a* and the door frame 9*b*. FIG. 2B shows a half-open position with an opening angle α of 90°. In the FIG. 2C open position, the door panel 9*b* has pivoted through a maximum opening angle α of 180° from the closed position.

As can be seen from a comparison of FIGS. 2A to 2C, the first hinge link 5 has a first contact face 10. This first contact face 10 lies in a plane 11 that extends through the connecting pin 8 and is spaced from the axis 6 by a minimum distance of less than 5 mm. The second hinge link 7 has in turn a second contact face 12 that in the FIG. 2 open position lies flatly in face contact against the first contact face 10. According to the invention a projection 13 of the first contact face 10 in the open position engages in a recess 14 of the second hinge link 7 complementarily. This face contact stabilizes the hinge link assembly 4 in the open position, and prevents thus a "springy" feel.

Here the projection 13 has a substantially rectangular cross-section formed by two side faces 13*a* and an upper face 13*b* that merge into each other at rounded corners. The side face 13*a* turned away from the first contact face 10 merges into an outer face of the first hinge link 5 that is in the same plane 11 as the first contact face 10.

The recess 14 of the second hinge link 7 is constructed such that in the open position it is in full surface contact against the side face 13*a* and cover face 13*b*. This ensures a multidimensional form fit.

The link assembly 4 of door hinge is of the so-called six-axis type. In it the first hinge link 5 is connected to the first leaf assembly 2 by a first hinge pin 15*a* for pivoting about a first hinge axis a. The first hinge link 5 is pivotal on the second leaf assembly 3 about a second hinge axis b guided in the second leaf assembly 3. A second hinge pin 15*b* extends through the first hinge link 5 and through the pivot link 16 and is movable in an arcuate guide on the second leaf assembly 3. The pivot link 16 is carried on another hinge pin 17 pivoted on the second leaf assembly 3 at a pivot axis e. The second hinge link 7 on the other hand is connected to the first leaf assembly 2 for pivoting about a third hinge axis c that is positively guided for straight-line movement in a guide 18. The link guide 18 has a groove 18*a* in which moves a slide block 18*b* that carries a third hinge pin 15*c* concentric to the third hinge axis c. The second hinge link 7 is pivotal on the second leaf assembly 3 at a fourth hinge pin 15*d* itself on a fourth hinge axis.

As particularly shown in FIG. 1, the first leaf assembly 2 has a first casing 2*a* for fastening to the door panel 9*a* and a two-part hinge mount 2*b*. The hinge mount is formed from two mirror-symmetrically formed individual parts that both form the grooves 18*a* for the link guide 18 as well as the seats for the first hinge pin 15*a*. For horizontal adjustment, the hinge link mount 2*b* is thereby movable via set screws 2*c* in the horizontal direction x.

Analogously, the second leaf assembly 3 has a second casing 3*a* also holding the hinge assembly 4 is held. For this purpose two inner inserts 3*b* are provided that hold the fourth hinge pin 15*d* for pivoting of the second hinge link 7 as well as the pivot pin 17 for the pivot link 16. The inner inserts 3*b* are movable for eccentric adjustment in the pressure direction y on a middle insert 3*c*. The middle insert 3*c* is in turn shiftable in the vertical direction z on the m second casing 3*a*.

As can be seen from a comparative view of FIGS. 2B and 2C, the second hinge link 7 has an outer face 19 that in the open position lies flatly in surface contact against an associated inner face 20 of the pivot link 16. The inner face 20 extends in a plane 21 extending running through the pivot axis e. On the second hinge link the outer face 19 forms with the second contact face 12 an angle μ of about 120°.

FIG. 2A shows that the pivot link 16 in the closed position rests with a back face 22 against the casing 3*a* of the second leaf assembly 3.

Figure 3:
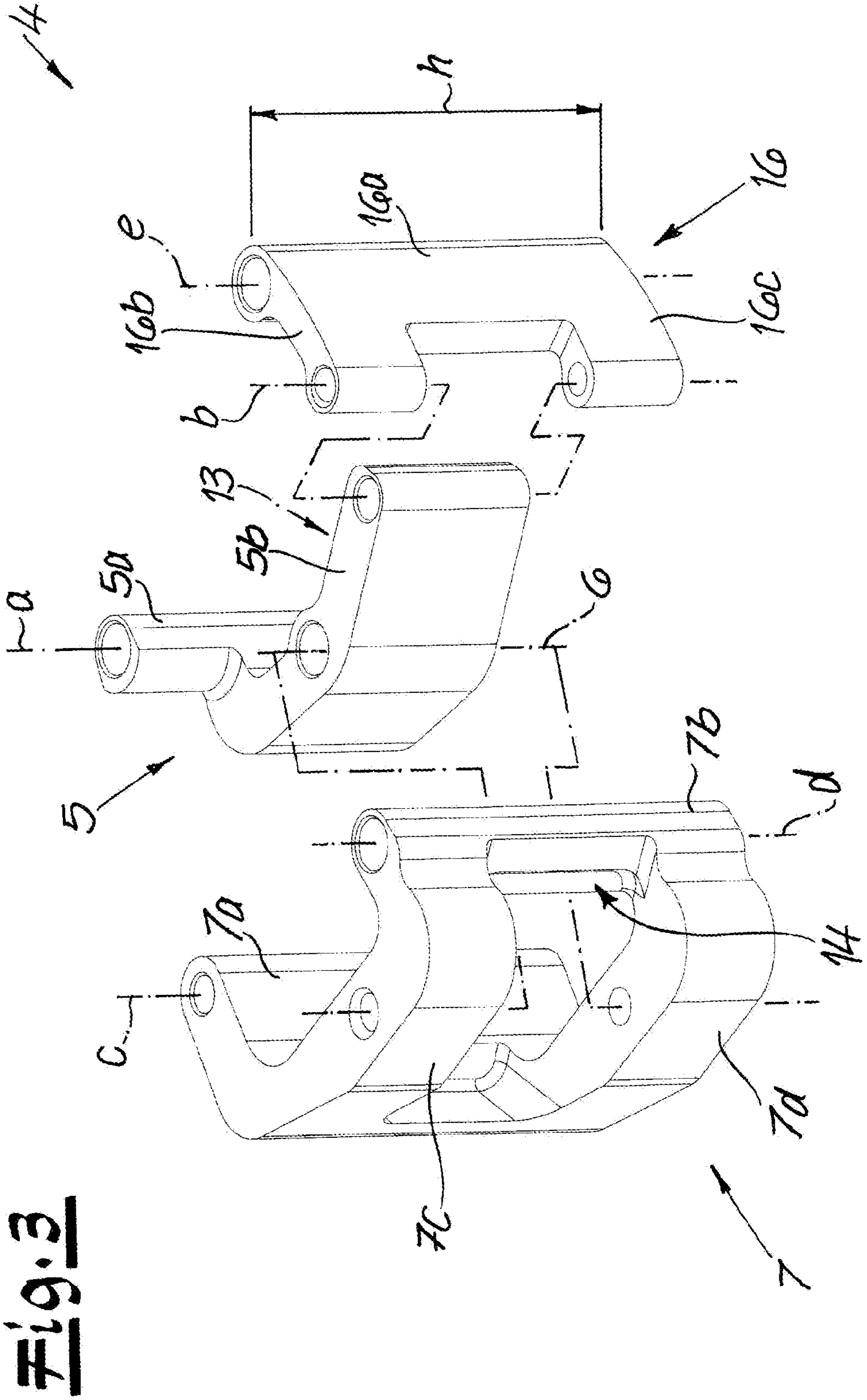
FIG. 3 is a three-dimensional exploded view of the hinge link assembly of the door hinge.

In FIG. 3 the individual components of the link assembly 4 are shown in an exploded view. There the position of the hinge axes a to d, the pivot axis e as well as of the connecting axis 6 are shown with dot-dash lines. The first hinge link 5 is T-shaped with a crosspiece 5*a* and an integral central leg section 5*b*. The second hinge link 7 is in turn 0-shaped with two vertical side members 7*a* and 7*b* and two horizontal members 7*c* and 7*c* joining the vertical bars 7*a* and 7*b* to each other horizontally. The horizontal members 7*c* and 7*d* thus embrace the middle member 5*b* of the first hinge link 5 in the vertical direction z. The pivot link 16 is C-shaped with a vertical bar 16*a* and two horizontally projecting members 16*b* and 16*c*. These embrace the end of the middle member 5*b* of the first hinge link 5 opposite the first vertical member 5*a* and are connected to it rotationally about the second hinge axis b. In the illustrated embodiment, the projection according to the invention 13 is formed on the unillustrated rear side of the middle member 5*b* of the first hinge link. The recess 14 is visible as a bulge on the second vertical member 7*b* of the second hinge link 7. While all vertical elements 5*a*, 7*a*, 7*b*, and 16 extend over the same height h, the projection 13 and the recess 14 are not more than half of this height.

I claim:

1. A door hinge comprising:

a first leaf assembly, a second leaf assembly and a link assembly for pivoting of the first leaf assembly on the second leaf assembly between an open position and a closed position, the link assembly comprising a first hinge link connected to the first leaf assembly so as to be pivotable about a first hinge axis, the first hinge link being pivotal about a second hinge axis positively guided on the second leaf assembly, and a second hinge link pivoted about a connecting axis on the first link, the first hinge link having a contact face that in the open position flatly engages a contact face of the second hinge link, the first contact face also having a projection that in the open position engages complementarily in a recess of the second hinge link, the second hinge link being connected to the first link assembly so as to pivot about a third hinge axis that is positively guided on the first leaf assembly, the second hinge link being connected to the second leaf assembly so as to pivot about a fourth hinge axis.

2. The door hinge according to claim 1, wherein the second hinge axis is guided on the second leaf assembly in a link guide.

3. The door hinge according to claim 1, further comprising:

a pivot link carrying the second hinge axis on the second leaf assembly.

4. The door hinge according to claim 3, wherein the pivot link in the open position lies flat against an outer face of the second hinge link.

5. The door hinge according to claim 4, wherein the outer face forms with the second contact face an angle between 90° and 135°.

6. The door hinge according to claim 4, further comprising:

another pivot pin connecting the pivot link to the second leaf assembly and coaxial to a pivot axis of the other pivot pin, the outer face extending in a plane extending through the axis of the other pivot pin.

7. The door hinge according to claim 3, wherein the pivot link in the closed position bears with a back face against a casing of the second leaf assembly.

8. A door hinge comprising:

a first leaf assembly, a second leaf assembly and a link assembly for pivoting of the first leaf assembly on the second leaf assembly between an open position and a closed position, the link assembly comprising a first hinge link, a second hinge link pivoted about a connecting axis on the first link, the first hinge link having a contact face that in the open position flatly engages a contact face of the second hinge link, the contact face having a projection that in the open position engages complementarily in a recess of the second hinge link, and a hinge pin connecting the first hinge link and the second hinge link and centered on the connecting axis, the first contact face extending in a plane passing through the hinge pin.

9. A door hinge comprising:

a first leaf assembly, a second leaf assembly and a link assembly for pivoting of the first leaf assembly on the second leaf assembly between an open position and a closed position, the link assembly comprising a first hinge link, and a second hinge link pivoted about a connecting axis on the first link, the first hinge link having a contact face that in the open position flatly engages a contact face of the second hinge link, the first contact face also having a projection that in the open position engages complementarily in a recess of the second hinge link, the first hinge link is being T-shaped with a horizontal crosspiece and a central leg member, the second hinge link being O-shaped with two vertical members and two horizontal members surrounding the central leg member, the pivot link being C-shaped.

10. The door hinge according to claim 9, wherein the projection is formed on the leg member of the first hinge link.

11. The door hinge according to claim 9, wherein the recess is formed on one of the vertical members and extends over not more than the half of a vertical height of the second hinge link.

* * * * *